United States Patent
White, Jr. et al.

(10) Patent No.: US 6,996,955 B2
(45) Date of Patent: Feb. 14, 2006

(54) SYSTEM FOR CONVEYING PACKAGING CUSHIONS

(75) Inventors: Robert A. White, Jr., Watertown, CT (US); Paul Van Huis, Whitehall, NY (US); Ronald Sledzieski, Bethel, CT (US)

(73) Assignee: Sealed Air Corporation (US), Saddle Brook, NJ (US)

( * ) Notice: Subject to any disclaimer, the term of this patent is extended or adjusted under 35 U.S.C. 154(b) by 0 days.

(21) Appl. No.: 10/661,235

(22) Filed: Sep. 12, 2003

(65) Prior Publication Data

US 2005/0055987 A1  Mar. 17, 2005

(51) Int. Cl.
B65B 57/10 (2006.01)

(52) U.S. Cl. ............... 53/495; 53/79; 406/3; 406/8; 406/156; 83/402; 83/950

(58) Field of Classification Search .......... 53/79, 53/501, 503, 507–508, 472, 512; 156/147, 156/145; 493/967, 287, 372; 406/3, 192, 406/8, 156, 157, 93, 94; 226/97.1, 97.2, 226/97.3, 97.4
See application file for complete search history.

(56) References Cited

U.S. PATENT DOCUMENTS

| | | | |
|---|---|---|---|
| 1,597,438 A * | 8/1926 | Ennis | ............................ 53/79 |
| 3,588,178 A | 6/1971 | Fulchiron | |
| 3,762,772 A | 10/1973 | Fuss | |
| 3,817,803 A | 6/1974 | Horsky | |
| 4,167,235 A | 9/1979 | Green | |
| 4,284,372 A | 8/1981 | Smith | |
| 4,799,830 A | 1/1989 | Fuss | |
| 5,340,632 A | 8/1994 | Chappuis | |
| 5,552,003 A * | 9/1996 | Hoover et al. | ................ 53/472 |
| 5,581,983 A * | 12/1996 | Murakami | ................... 53/512 |
| 5,846,030 A * | 12/1998 | Beard et al. | ................... 406/3 |
| 5,868,657 A | 2/1999 | Simmons | |
| 5,891,009 A | 4/1999 | Ratzel et al. | |
| 5,942,076 A | 8/1999 | Salerno et al. | |
| 6,041,936 A * | 3/2000 | Weder | ......................... 53/472 |
| 6,428,246 B1 | 8/2002 | Landrum | |
| 6,453,644 B1 | 9/2002 | Baker | |
| 6,519,916 B1 * | 2/2003 | Brown | ....................... 53/403 |

(Continued)

FOREIGN PATENT DOCUMENTS

NL  1 015 126 C  11/2001

(Continued)

Primary Examiner—Stephen F. Gerrity
Assistant Examiner—Thanh Truong
(74) Attorney, Agent, or Firm—Alston & Bird LLP

(57) ABSTRACT

There is provided a system that automatically delivers, monitors and replenishes a string of packaging cushions to hoppers located at multiple packing stations through an elongated cushion delivery duct having a series of intermediate outlets to permit the string of cushions to drop into the hopper located below the delivery duct and above the packing station. A blower is positioned near the inlet of the elongated duct to provide air flow in the duct to carry the string of cushions through the duct to one of the outlets. When the hopper is full of cushions sensors signal the controller to close the diverter and the string of cushions is delivered to another packaging station. The system may include a knife assembly to cut the string of cushions holding pins and the tension-relief diverter it is located at the inlet of the duct to hold tension on the string of cushions while the string is being separated. The tension release gate also has the purpose of relieving tension on the machine producing cushions during the machines feed/fill cycle.

23 Claims, 4 Drawing Sheets

U.S. PATENT DOCUMENTS

| | | |
|---|---|---|
| 6,536,183 B1 | 3/2003 | Brown |
| 6,651,406 B2 * | 11/2003 | Sperry et al. .................. 53/79 |
| 6,910,610 B2 * | 6/2005 | Bartlett et al. ............. 226/97.1 |
| 2003/0079439 A1 | 5/2003 | Brown |
| 2005/0178085 A1 * | 8/2005 | Huis et al. .................... 53/403 |

FOREIGN PATENT DOCUMENTS

| | | |
|---|---|---|
| NL | 1015126 | 1/2002 |

* cited by examiner

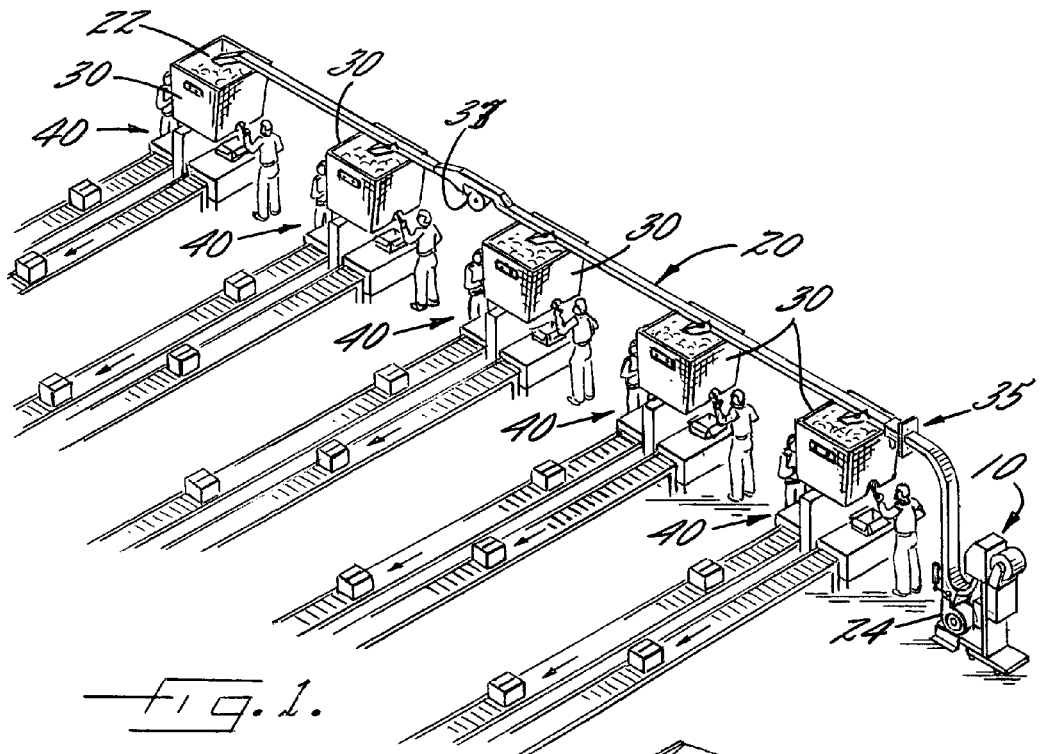
Fig. 1.
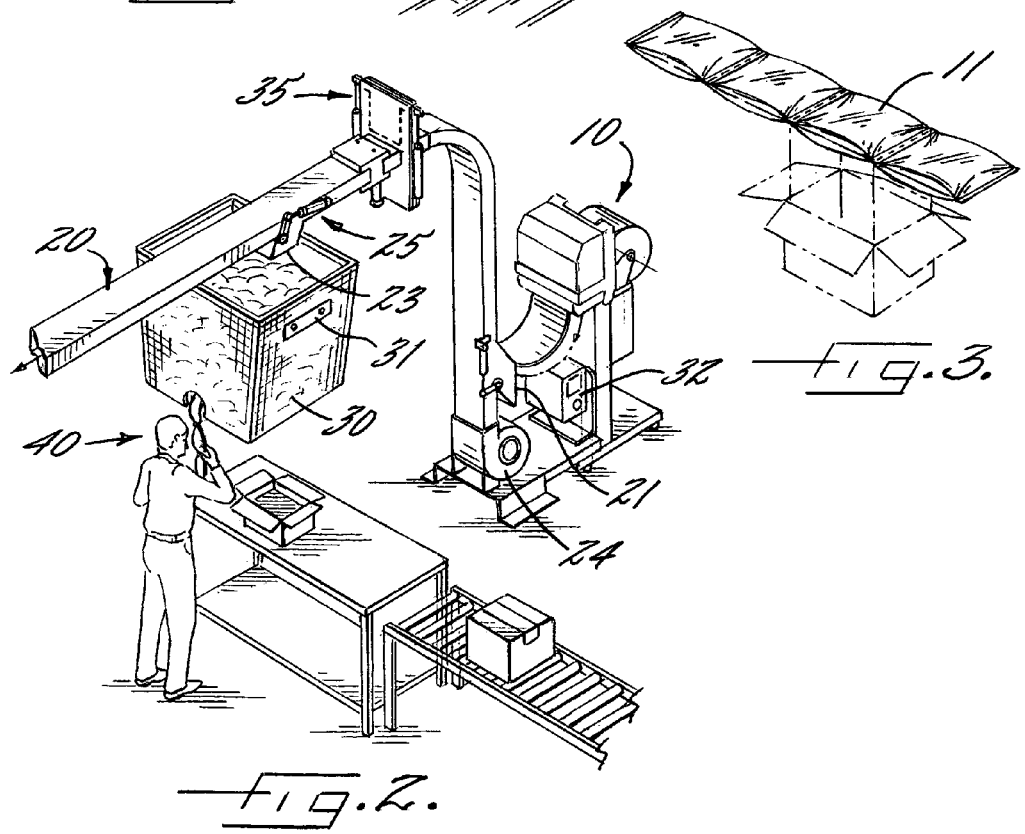
Fig. 3.
Fig. 2.

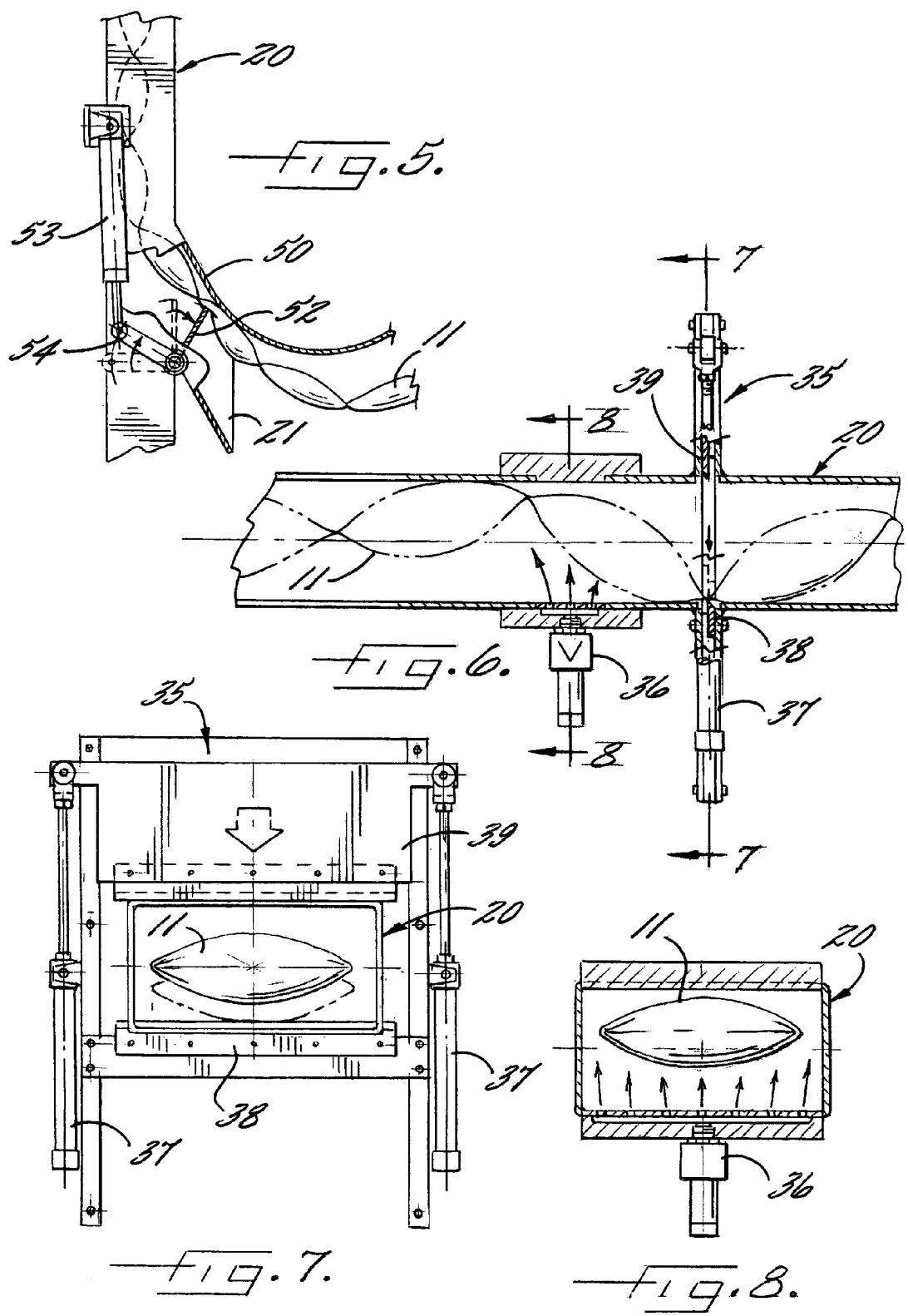

SYSTEM FOR CONVEYING PACKAGING CUSHIONS

BACKGROUND OF THE INVENTION

1. Field of the Invention

The present invention is to a system for conveying packaging cushions to multiple packing stations. More particularly, the present invention is to a system that automatically and efficiently produces and delivers, monitors and replenishes a string of packaging cushions through an elongated duct into storage bins located above multiple packing stations.

2. Description of Related Art

When articles are packaged in a container or box for shipping, there are usually void spaces in the container. Protective packaging material for articles of different sizes and shapes is commonly used to cushion articles during shipping. Numerous types and forms of packaging material for this purpose have been used including waste paper, embossed paper, laminated bubble paper, foamed material and plastic beads. These packaging materials do not always provide the cushioning and void fill most effect to protect articles during shipment. Also, these packaging materials can be costly and often require that a significant amount of labor be performed at the packing station. As a result, thermoplastic cushions have been proposed for use in protecting articles during shipment. One such packaging cushion that has found widespread use is a multiple use inflatable cushion that is specifically designed to be placed around a particular article to be protected and is inflated after the cushion is placed in the shipping container. These types of cushions, while expensive, are particularly useful for the protection of certain types of articles but because each cushion is inflated at the packaging station the packaging process is labor intensive.

However, advantages may be obtained by using simple cellular cushions made of thermoplastic material. Examples of methods of making such cellular cushions are shown in U.S. Pat. Nos. 3,817,803 and 5,340,632. The ability to make these types of cushions simply and at the point of use is of paramount importance. Another example of a device for making cushions is U.S. Pat. No. 5,942,076 that describes a machine that includes sealing sheets of thermoplastic material together to form a tube, introducing air to the tubular material and sealing the ends to make rectangular air-filled cushions of various sizes. The cushion supply machine is located adjacent the product conveyer so that as a container, such as a corrugated box, holding an article to be protected, passes the cushion forming section the operator starts the machine and a series of inflated packaging cushions fall into the container. This system supplies only one packing station at a time.

Once a string of packaging cushions has been formed it is necessary to deliver them to the article packing station. U.S. Pat No. 6,536,183 discloses a system for delivering packaging cushions to a point of use in which a continuous string of the cushions is fed into a elongated duct with the string extending longitudinally of the duct. An air flow is established in the duct to convey the string of cushions through the duct to the point of use. In U.S. Pat. No. 6,428,246 there is disclosed a system and method for making, conveying and dispensing packing material to a packing station. The packaging material is a chain of linked cushions and the system includes a pressurized duct to an elongated hopper located above a plurality of packing stations. The elongated hopper includes air jets that transfer the string of packaging cushions between each jet to a remote end of the hopper. Located at intervals along the length of the hopper are a series of dispensing openings so the cushions may be accessed ax each of the packing stations.

Thus, it is desirable to provide a system capable of efficiently and automatically supplying a string of packaging cushions to be stored in a hopper or bin located at each of multiple packing stations.

BRIEF SUMMARY OF THE INVENTION

In accordance with the present invention, in its broadest sense, there is provided a system that automatically delivers, monitors and replenishes packaging cushions to multiple hoppers. In a preferred embodiment the system includes a cushion supply machine that delivers packaging cushions through an elongated duct to hoppers located at multiple packing stations. The elongated cushion delivery duct may have a series of intermediate outlets above the hoppers to permits the string of packaging cushions to drop into the hopper. Each of the hoppers may be located below the delivery duct and above a packing station. A blower is positioned near the inlet of the elongated duct to provide air flow in the duct to carry the string of packaging cushions through the duct to one of the outlets located above the appropriate packing station whereupon the string of cushions is diverted into the hopper.

In the preferred embodiment, the system includes a knife assembly to cut the string of cushions into lengths that respond to the priority of need in the various hoppers. Prior to the knife cycling to sever the string of cushions, the tension relief gate is held closed, the holding pins are engaged to tension the cushion string for cutting. Now we cycle the knife. The cycling knife stalls air flow momentarily in the duct. The engaged holding pins are not released until the air flow is reestablished to ensure the chain of cushions traveling to the appropriate hopper. The priority of hopper levels, the knife assembly, the tension relief diverter, and the holding pins are controlled by signals from the controller.

Each of the hoppers is automatically monitored and replenished with cushions. When the hopper is full of cushions a sensor signals the controller to close the diverter and the string of cushions is delivered to another packaging station. This is preferably accomplished with a photo eyes in the hopper to send signals to the controller to stop the machine, cut the string of cushions and change the intermediate outlet diverter.

It is therefore, the general object of the present invention to provide a system for delivering packaging cushions to a hopper located at multiple packing stations where the packaging cushions are to be used.

Another object of the present invention is to provide a system that automatically and efficiently produces and delivers, monitors and replenishes a string of packaging cushions through an elongated duct multiple packing stations to a storage bin located above each packing station for easy access and use by a worker.

Other objects, features and advantages of the present invention will become apparent from the following detailed description of the invention taken in conjunction with the accompanying drawings.

BRIEF DESCRIPTION OF THE DRAWINGS

Having thus described the invention in general terms, reference will now be made to the accompanying drawings, which are not necessarily drawn to scale, and wherein

Figure 4:
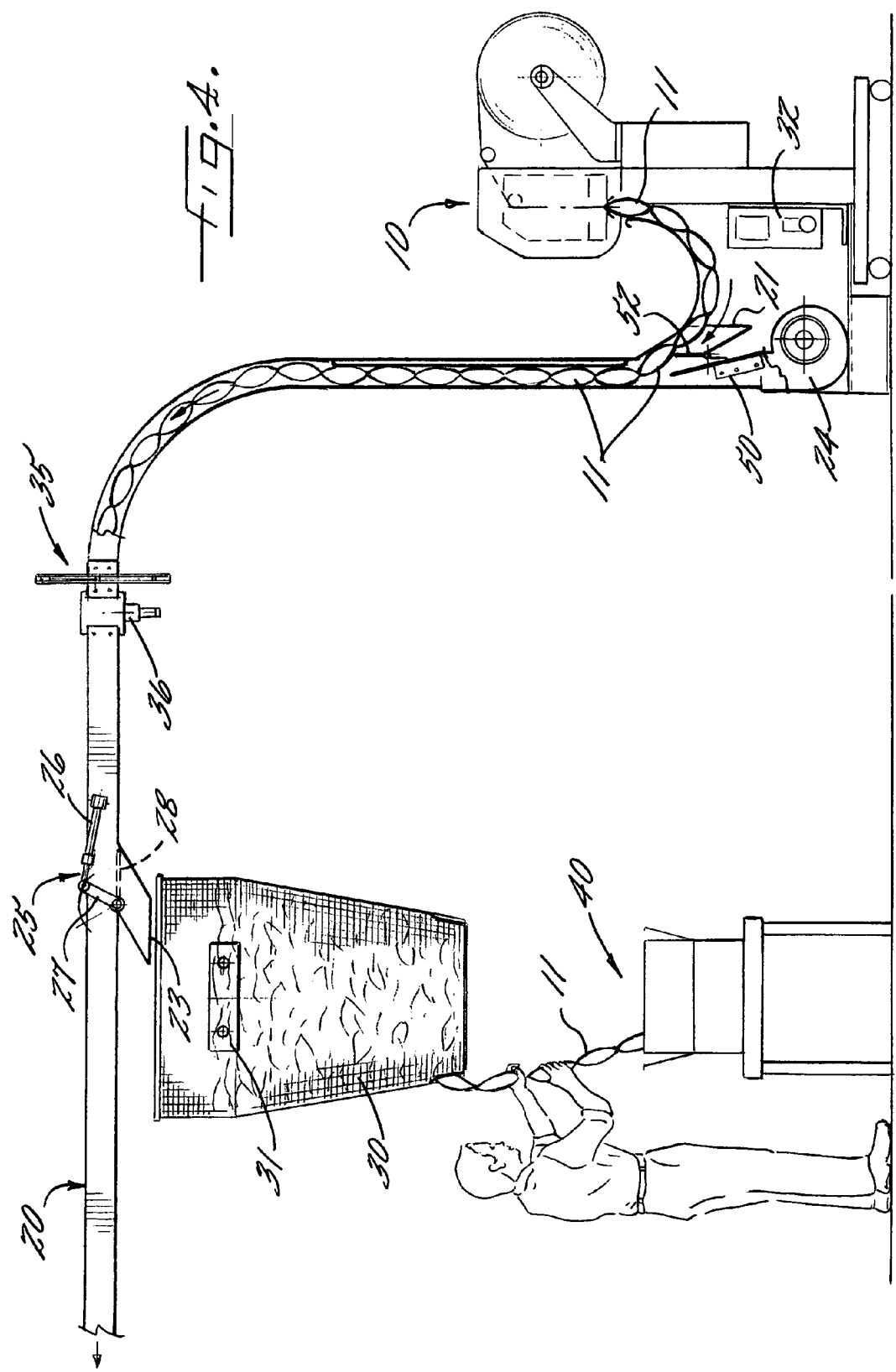
Figure 9A:
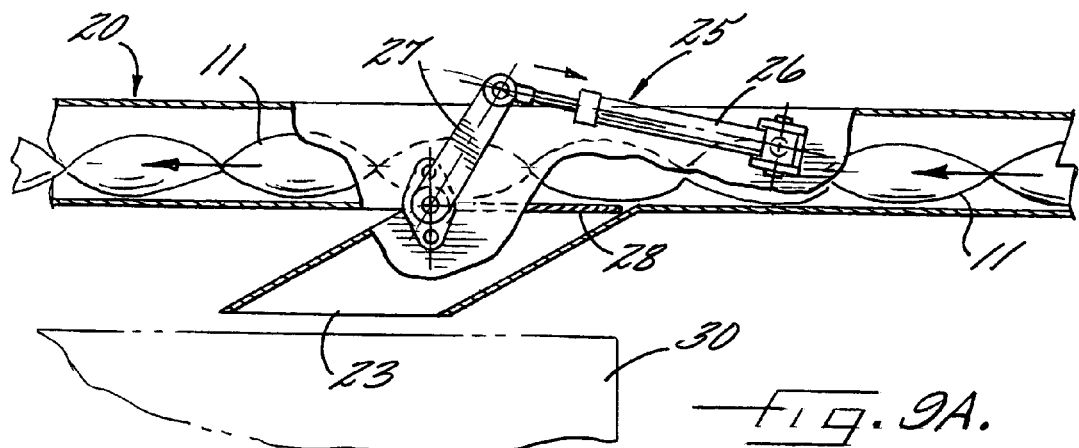
Figure 9B:
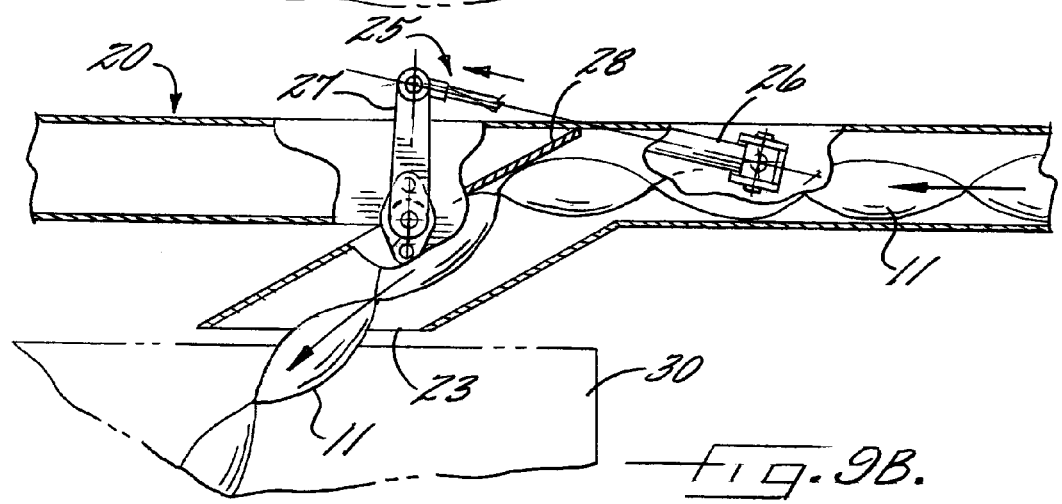
Figure 10:
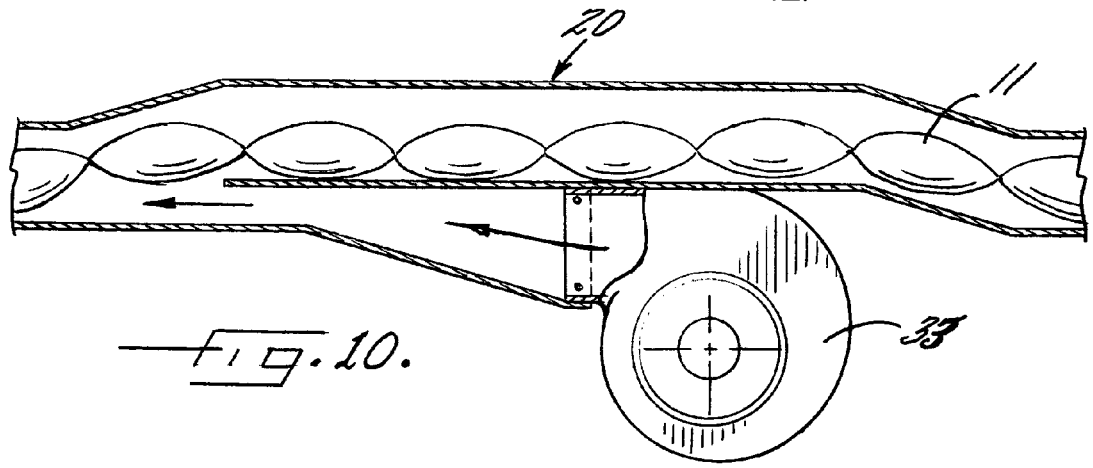

FIG. 1 is an isometric view of a system for making and delivering packaging cushions to overhead bins located above a plurality of packaging stations according to the present invention;

FIG. 2 is a partial view of the cushion forming machine and the delivery system to a single packing station;

FIG. 3 is an isometric view of a string of packaging cushions attached to each other made by a cushion supply machine;

FIG. 4 is a side view of the system for making, delivering and storing packing cushions to a bin located above a packing station according to the present invention;

FIG. 5 is a side view of the tension release gate in the inlet duct;

FIG. 6 is a side view of the knife assembly located transverse of the duct;

FIG. 7 is a sectional view of the knife assembly used to separate the strings of cushions as the string proceeds through the duct taken along line 7—7 of FIG. 6;

FIG. 8 is a sectional view of the holding pins taken along line 8—8 of FIG. 6;

FIG. 9A is a side view of the cushion delivery duct illustrating the diverter valve in a closed position at a hopper;

FIG. 9B is a side view of the cushion delivery duct illustrating the diverter valve at the hopper in the open position; and FIG. 10 is a side view of the cushion delivery duct illustrating a booster blower for assisting a string of cushions through the elongated duct.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Referring more particularly to the drawings, there is shown in FIG. 1 an overview of a system according to the present invention for making and delivering packaging cushions to multiple packaging stations 40. In a preferred embodiment, a cushion-supply machine 10 makes a string of packaging cushions 11. The string of cushions is delivered to elongated duct 20. It should be understood that the string of cushions 11 does not have to be delivered directly from a cushion supply machine but may be delivered from other sources. As shown, the elongated duct 20 extends past multiple packing stations 40. The number of packing stations 40 in any particular system will, of course, vary with the volume of articles to be packaged. The elongated duct 20 has a series of intermediate outlets 23 above each hopper 30 for storing the strings of cushions 11. Each of the hoppers 30 is located below the elongated delivery duct 20 and above a packing station 40.

As shown more clearly in FIG. 2, the cushion-forming machine 10 makes a string of packaging cushions that are delivered to elongated delivery duct 20. The elongated delivery duct 20 has an inlet end 21, an outlet end 22, and at least one intermediate outlet 23 between the inlet and outlet ends. The inlet end 21 of delivery duct 20 is capable of receiving the string of packaging cushions. A blower 24 positioned near the inlet 21 of elongated duct 20 provides air flow in the duct to carry the string of packaging cushions through the duct to one of the outlets, such as intermediate outlet 23, located above the appropriate packing station 40 whereupon the string of cushions 11 is diverted through diverter 25 into hopper 30. The hopper or bin 30 may be a mesh basket that holds the cushions 11. Once the hopper 30 that is being filled is sensed as full by sensors 31, preferably photo eyes in the hopper, the system controller 32 stops the cushion production in the cushion supply machine 10, cuts the string of cushions 11, holds the string 11 in the duct 20 until air flow is reestablished, releases the string, then changes the ducting valve path to prepare to send cushions to the next hopper that needs replenishing at a different packing station. The cushion production then continues and the next hopper is filled. As shown, packing operators reach into the overhead hopper 40 through an opening taking a string of cushions to be used in packing the article to be shipped.

A preferred packaging cushion is an air-filled cushion such as the cushions shown in FIG. 3 which illustrate a string of cushions 11 as the string would be being prepared to be placed in a box holding an article for shipping. A preferred cushion supply machine for making the packaging cushions is a Fill Air 1000® inflatable bag making machine available from Sealed Air Corporation. It should be understood that the term packaging cushion also includes foam-filled cushions.

As shown more clearly in FIG. 4, a string of cushions 11 is delivered from cushion supply machine 10 to elongated duct 20. As shown, each cushion of the string of packaging cushions is connected to at least one other adjoining cushion of the string. This string of packaging cushions blown through duct 20 by blower 24 providing air flow at the inlet end of the duct. The length of the string of cushions 11 is predetermined and the string severed at knife assembly 35 located in the horizontal portion of duct 20, more fully described in FIG. 6. When the knife blade is in the down position severing the string of cushions tension is necessary for a clean cut. Tension is accomplished by using the tension release gate and holding pins. Once severed the string of cushions is carried by the air flow in the duct 20 to the appropriate diverter 25 where the string passes through the opening in the diverter and into the hopper 30, where the cushions are stored until used. The controller 32 generates a signal to the diverter 25 and a signal to the knife assembly 35 in a coordinated sequence so that cutter blade 39 severs the string of cushions before the diverter 25 adjusts from one position to the other.

One aspect of the present invention is to provide a means for applying tension in the string of cushions when the string is separated; that is accomplished through tension-relief gate and holding pins 36. As shown in FIG. 5, there is provided tension-relief gate 52 located at the inlet end of duct 20. When activated by a signal from the controller 32, this mechanism moves tension relief gate 52 against the string of cushions holding the string of cushions in place and serving to relieve the tension on the bag stream during the fill cycle. Without the tension relief gate 52, the cushion supply machine may produce flat bags. Tension relief gate 52 is coordinated to hold the string of packaging cushions 11 until just before the cushion supply machine's feed cycle. For that purpose a controller 32, shown in FIG. 4, is adapted to generate the signal in a coordinated sequence. The position of the tension relief gate 52 is controlled by air cylinder 53 operating upon lever 54 in response to a signal from the controller 32.

The length of the string of cushions is determined so that the next string of cushions may be delivered to another bin. The packer, taking a string of cushions out of the bins, decides how long the string needs to be to pack a particular container. The packer simply tears the string of cushions at the perforations between the individual cushions. Such a knife assembly is shown in FIGS. 6 and 7 wherein the knife assembly 35 is placed after the top curve in the horizontal portion of duct 20. A preferred cutting blade is triangular tooth guillotine blade 39 placed in assembly frame 38. As shown in FIG. 7, air cylinders 37, acting in response to a signal from controller 32 move the blade 39 up and down in frame 38. Of course, other methods of separating, such as tearing at perforations in the area between individual cushions, may be used.

When the knife blade 39 is lowered to sever the string of cushions, the airflow in duct 20 is blocked. The holding pins shown in FIG. 8 are used to maintain the string of cushions 11 above the bottom of the duct 20 until the knife is returned to its upward position and the airflow is reestablished within the duct. Otherwise the air flow over the top of the cushions will hold them to the bottom of the duct and not allow them to move.

As shown in FIGS. 9A and 9B, a diverter 25 in delivery duct 20 and is adapted to move between a diverting position shown in FIG. 9B and a by-pass position shown in FIG. 9A in response to a signal from controller 32, wherein the diverter 25 in the diverting position establishes a first flow path for the string of cushions in the duct from the inlet end 21 through intermediate outlet 23 in the duct 20, and the diverter 25 in the by-pass position blocks the intermediate outlet 23 to establish a second flow path for the string of cushions from the inlet end past the intermediate outlet. The position of the diverter 25 is controlled by air cylinders 26 operating upon lever 27 to move door 28 to the position dictated by the signal from the controller 32.

In systems having a large number of packing stations and consequently a like number of intermediate outlets 23 the elongated duct 20 may extend for some 30 to 40 feet or so. In such cases a substantial amount of the air flow created by blower 24 used to carry the string of cushions is lost through the intermediate outlets 23. When loss of significant air pressure occurs it is difficult for the remaining air flow to carry the string to the intermediate outlets furtherest from the inlet end 21 of the duct 20. To overcome this problem a booster blower 33 is provided at an appropriate location in elongated duct 20 as shown in FIG. 10. The booster blower 33 allows the primary blower 24 to exhaust and the booster to make up flow. This allows delivery to the furtherest hopper from the inlet duct.

In operation, the system begins by filling each of the bins one after the other in which case the diverter 25 located at each of the intermediate outlets 23 in duct 20 are closed except for the hopper 30 being filled. When the first hopper is filled, the electric eyes sense the level in the hopper and signals the controller 32, which signals the knife assembly 35 to sever the string, and signals the diverter 25 in the duct adjacent the first hopper to close and at the same time open the diverter in the second hopper. This procedure is continued until each of the hoppers are filled or replenished as the case may be.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for conveying a string of cushions comprising:
    (a) an elongated cushion delivery duct having an inlet end and means for conveying a string of cushions from one point to another within said duct;
    (b) means for diverting said string of cushions to a plurality of work stations;
    (c) a separator located within said elongated cushion delivery duct, said separator adapted to sever said string of cushions in response to a signal; and
    (d) a controller adapted to generate a signal to control the diversion of the string of cushions and separating said string of cushions.

2. A system according to claim 1 where the conveying means is a blower.

3. The system according to claim 2 further comprising a booster blower located in said elongated cushion delivery duct remotely from said inlet end.

4. A system according to claim 1 where the conveying means is a machine conveyor.

5. The system according to claim 1 further comprising at least one storage hopper to receive said string of cushions located below said diverter in said conveying means.

6. The system according to claim 5 further comprising a sensor to generate a signal to said controller indicating when said hopper needs additional cushions and to automatically fill said hopper with packaging cushions.

7. The system according to claim 1 further comprising a tension relief gate located in said conveying means coordinated to hold the string of packaging cushions before the cushion-supply machine's feed cycle.

8. The system according to claim 1 further comprising one or more additional intermediate outlets and one or more additional diverters.

9. The system according to claim 1 wherein said separator is a knife assembly.

10. The system according to claim 9 further comprising holding pins positioned in the bottom of said elongated cushion delivery duct following said separator to maintain said string of cushions above the bottom of said conveying means.

11. A system for conveying a string of packaging cushions comprising:
    (a) an elongated cushion delivery duct having an inlet end, an outlet end, and at least one intermediate outlet between said inlet and outlet ends, said inlet end of said duct capable of receiving said delivered string of cushions;
    (b) a blower adapted to establish an airflow in said duct to assist the transport of said string of packaging cushions within said duct;
    (c) a diverter in said delivery duct adapted to move between a diverting position and a by-pass position in response to a diverter signal, wherein:
    said diverter in said diverting position establishes a first flow path for said string of cushions in said duct from said inlet end through said at least one intermediate outlet of said duct, and
    said diverter in the by-pass position blocks said at least one intermediate outlet to establish a second flow path for said string of cushions from said inlet end past said at least one intermediate outlet;

(d) a separator between said inlet end and said at least one intermediate outlet of said duct, said separator adapted to separate said string of packaging cushions in said duct upon response to a signal; and (e) a controller adapted to generate said diverter signal and a cutting signal in a coordinated sequence so that said separator severs said string of cushions before said diverter adjusts from said diverting position to said by-pass position and from said by-pass position to said diverting position.

12. The system according to claim 11 further comprising a cushion-supply machine capable of delivering a string of packaging cushions into a duct, wherein each cushion is connected to at least one other adjoining packaging cushion of said string of packaging cushions.

13. The system according to claim 12 wherein said packaging cushions are air-filled cushions.

14. The system according to claim 11 further comprising at least one storage hopper to receive said string of cushions located below said diverter in said conveying means.

15. The system according to claim 14 further comprising a sensor to generate a signal to said controller indicating when said hopper needs additional cushions and to automatically fill said hopper with packaging cushions.

16. The system according to claim 11 further comprising one or more additional intermediate outlets and one or more additional diverters.

17. The system according to claim 16 further comprising a booster blower located in said elongated cushion delivery duct remotely from said inlet end.

18. The system according to claim 11 wherein said separator is a knife assembly.

19. The system according to claim 18 further comprising holding pins positioned in the bottom of said elongated cushion delivery duct following said separator to maintain said string of cushions above the bottom of said conveying means.

20. A system for conveying a string of packaging cushions comprising:

(b) an elongated cushion delivery duct having an inlet end, an outlet end, and at least one intermediate outlet between said inlet and outlet ends, said inlet end of said duct capable of receiving said delivered string of cushions;

(b) a blower adapted to establish an airflow in said duct to assist the transport of said string of packaging cushions within said duct;

(c) a diverter in said delivery duct adapted to move between a diverting position and a by-pass position in response to a diverter signal, wherein:

said diverter in said diverting position establishes a first flow path for said string of cushions in said duct from said inlet end through said at least one intermediate outlet of said duct, and said diverter in the by-pass position blocks said at least one intermediate outlet to establish a second flow path for said string of cushions from said inlet end past said at least one intermediate outlet;

(d) a separator between said inlet end and said at least one intermediate outlet of said duct, said separator adapted to separate said string of packaging cushions in said duct upon response to a signal;

(e) a controller adapted to generate said diverter signal and a cutting signal in a coordinated sequence so that said separator severs said string of cushions before said diverter adjusts from said diverting position to said by-pass position and from said by-pass position to said diverting position; and (f) a tension relief gate located in said duct adapted to hold the string of cushions at a selected time.

21. The system according to claim 20 wherein said selected time is during the fill cycle of a cushion supply machine.

22. The system according to claim 20 wherein said selected time is before the feed cycle of a cushion supply machine.

23. The system according to claim 20 wherein said selected time is while the separator severs the string of cushions.

* * * * *

UNITED STATES PATENT AND TRADEMARK OFFICE
CERTIFICATE OF CORRECTION

PATENT NO. : 6,996,955 B2 Page 1 of 1
APPLICATION NO. : 10/661235
DATED : February 14, 2006
INVENTOR(S) : White, Jr. et al.

It is certified that error appears in the above-identified patent and that said Letters Patent is hereby corrected as shown below:

<u>Column 2,</u>
Line 3, "ax" should read --at--.

Signed and Sealed this

Fifteenth Day of August, 2006

JON W. DUDAS
*Director of the United States Patent and Trademark Office*